(12) United States Patent
Takiguchi

(10) Patent No.: US 12,174,120 B2
(45) Date of Patent: *Dec. 24, 2024

(54) IMAGE ACQUISITION DEVICE, IMAGE ACQUISITION METHOD, AND SPATIAL LIGHT MODULATION UNIT

(71) Applicant: HAMAMATSU PHOTONICS K.K., Hamamatsu (JP)

(72) Inventor: Yuu Takiguchi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 880 days.

This patent is subject to a terminal disclaimer.

(21) Appl. No.: 15/772,844

(22) PCT Filed: Sep. 20, 2016

(86) PCT No.: PCT/JP2016/077687
§ 371 (c)(1),
(2) Date: May 2, 2018

(87) PCT Pub. No.: WO2017/077776
PCT Pub. Date: May 11, 2017

(65) Prior Publication Data
US 2018/0313759 A1  Nov. 1, 2018

(30) Foreign Application Priority Data
Nov. 6, 2015 (JP) ................. 2015-218528

(51) Int. Cl.
*G01N 21/64* (2006.01)
*G01N 21/01* (2006.01)
(Continued)

(52) U.S. Cl.
CPC ......... *G01N 21/6458* (2013.01); *G01N 21/01* (2013.01); *G01N 21/64* (2013.01);
(Continued)

(58) Field of Classification Search
CPC .... G01N 21/6458; G01N 21/01; G01N 21/64; G02B 21/361; G02B 21/365; G02B 21/06
See application file for complete search history.

(56) References Cited

U.S. PATENT DOCUMENTS 6,239,909 B1    5/2001  Hayashi et al.
10,466,458 B2*  11/2019  Takiguchi ............ G02B 21/367
(Continued)

FOREIGN PATENT DOCUMENTS

CN    1087999 A     6/1994
CN    1682317 A    10/2005
(Continued)

OTHER PUBLICATIONS

Simon et al. The correlation confocal microscope, Optics Express vol. 18, No. 10, pp. 9765-9779 (Year: 2010).*
(Continued)

*Primary Examiner* — David P Porta
*Assistant Examiner* — Shun Lee
(74) *Attorney, Agent, or Firm* — Faegre Drinker Biddle & Reath LLP

(57) ABSTRACT

An image acquisition device includes a light source, a spatial light modulator having a plurality of pixels, an objective lens for radiating the light modulated by the spatial light modulator to an observation target, a photodetector for capturing an image of the light from the observation target, and a control unit for controlling an amount of phase modulation of each pixel in accordance with a phase pattern in which phase values corresponding to the plurality of pixels are two-dimensionally distributed. The phase pattern is generated based on a predetermined basic phase pattern. The basic phase pattern includes a first region in which the phase value continuously increases in a predetermined direction, and a second region in which the phase value continuously
(Continued)

decreases in the predetermined direction and facing the first region in the predetermined direction.

10 Claims, 14 Drawing Sheets

(51) Int. Cl.
*G02B 21/06* (2006.01)
*G02B 21/36* (2006.01)
*G02B 21/16* (2006.01)
*G02B 26/06* (2006.01)

(52) U.S. Cl.
CPC .......... *G02B 21/06* (2013.01); *G02B 21/361* (2013.01); *G02B 21/365* (2013.01); *G01N 2201/0635* (2013.01); *G02B 21/16* (2013.01); *G02B 21/367* (2013.01); *G02B 26/06* (2013.01)

(56) References Cited

U.S. PATENT DOCUMENTS

| | | | |
|---|---|---|---|
| 2010/0135547 A1* | 6/2010 | Lee | G06T 3/4084 |
| | | | 382/128 |
| 2012/0018653 A1 | 1/2012 | Bowers et al. | |
| 2013/0335819 A1 | 12/2013 | Cooper | |
| 2014/0008525 A1 | 1/2014 | Simon et al. | |
| 2014/0055594 A1 | 2/2014 | Nomura et al. | |

FOREIGN PATENT DOCUMENTS

| | | |
|---|---|---|
| CN | 102265208 A | 11/2011 |
| CN | 103115585 A | 5/2013 |
| CN | 103311780 A | 9/2013 |
| CN | 104246615 A | 12/2014 |
| CN | 104303090 A | 1/2015 |
| CN | 105026916 A | 11/2015 |
| JP | H11-242189 A | 9/1999 |
| JP | 2010-152094 A | 7/2010 |
| JP | 2013-221953 A | 10/2013 |
| JP | 2015-99177 A | 5/2015 |
| WO | WO 2005/045361 A2 | 5/2005 |
| WO | WO 2014/051680 A1 | 4/2014 |
| WO | WO-2015/151838 A1 | 10/2015 |

OTHER PUBLICATIONS

Li et al. Selective plane illumination microscopy with structured illumination based on spatial light modulators, Proceedings of SPIE vol. 8949, 89491S, 5 pages (Year: 2014).*

Siviloglou et al. Observation of accelerating Airy beams, Physical Review Letters vol. 99, No. 21-23, 213901, 4 pages (Year: 2007).*

Davis Programmable diffractive optical elements using spatial light modulators, Proceedings of SPIE vol. 1911, pp. 214-225 (Year: 1993).*

Chowdhury, Shwetadwip, et al., "Structured oblique illumination microscopy for enhanced resolution imaging of non-fluorescent, coherently scattering samples," Biomedical Optics Express, vol. 3, No. 8, Aug. 1, 2012, pp. 1841-1854.

Gustafsson, Mats G. L., et al., "Three-Domensional Resolution Doubling in Wide-Field Fluorescence Microscopy by Structured Illumination," Biophysical Journal, vol. 94, No. 12, Jun. 2008, pp. 4957-4970.

Lang, Thorsten, et al., "Membrane Protein Clusters at Nanoscale Resolution: More Than Pretty Pictures," Physiology, vol. 25, No. 2, Apr. 1, 2010, pp. 116-124.

Oikawa, Yoshiro, "The Technologies and the Applications of Super Resolution Microscopy," Microscopy, vol. 47, No. 4, 2012, pp. 238-240, including English translation.

Li Runze et al, "Selective plane illumination microscopy with structured illumination based on spatial light modulators", Progress in Biomedical Optics and Imaging, SPIE—International Society for Optical Enginnering, Bellingham, WA, US, vol. 8949, Mar. 12, 2014, p. 89491S, XP060033925.

International Preliminary Report on Patentability mailed May 17, 2018 for PCT/JP2016/077687.

Runze Li, et al., "Selective plane illumination microscopy with structured illumination based on spatial light modulators", Research Gate, SPIE International Society for Optical Engineering vol. 8949, Mar. 12, 2014, p. 1-p. 6.

Shwetadwip Chowdhury, et al., "Structured oblique illumination microscopy for enhanced resolution imaging of non-fluorescent, coherently scattering samples", Biomedical Optics Express vol. 3, No. 8, Department of Biomedical Engineering, Fitzpatrick Institute for Photonics, Duke University, 136 Hudson Hall, Durham NC 27708, USA, Aug. 1, 2012, p. 1841-p. 1854.

Thorsten Lang, et al., "Membrane Protein Clusters at Nanoscale Resolution: More Than Pretty Pictures", Physiology vol. 25, 2010, p. 116-p. 124.

Li Zhongwei et al., "High Precision Phase Error Compensation Algorithm for Structural Light Measurement", ACTA OPTICA SINICA, vol. 28, No. 8, Aug. 31, 2008.

* cited by examiner

Fig.5
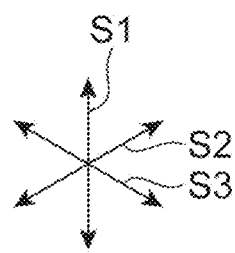
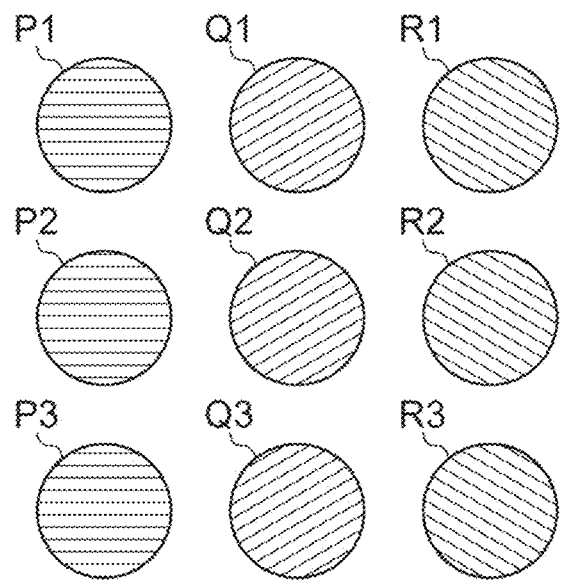

*Fig.13*
(a)
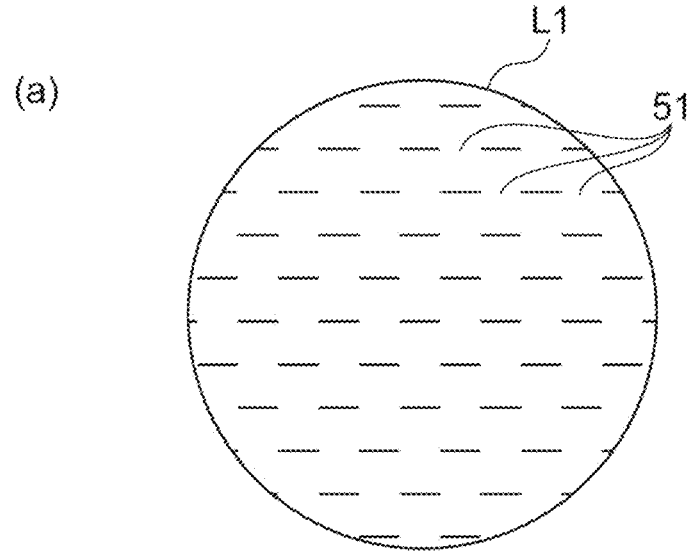
(b)
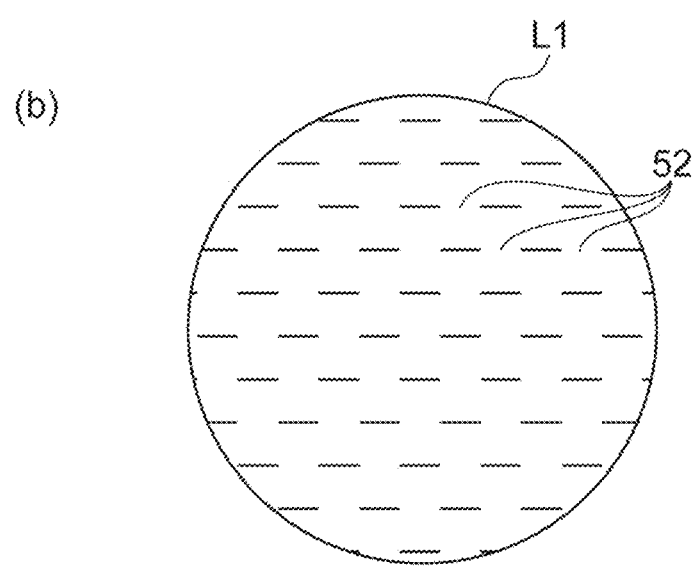

IMAGE ACQUISITION DEVICE, IMAGE ACQUISITION METHOD, AND SPATIAL LIGHT MODULATION UNIT

TECHNICAL FIELD

An aspect of the present invention relate to an image acquisition device, an image acquisition method, and a spatial light modulation unit.

BACKGROUND ART

Conventionally, there are structured illumination microscopes configured to acquire an image by radiating stripe-like light (structured illumination light) to an observation target and imaging fluorescence, reflected light, or the like emitted from the observation target in association with the radiation (for example, see the following Patent Literature 1 and 2 or Non-Patent Literature 1 and 2). These structured illumination microscopes include, for example, a diffraction grating, a translation mechanism for translating the diffraction grating and/or a rotation mechanism for rotating the diffraction grating, and the like. These mechanisms can change a phase and a stripe direction of the structured illumination light. Then, by changing the phase and the stripe direction of the structured illumination light to acquire a plurality of images and performing predetermined computation based on the images, it is possible to construct a super-resolution image having a high resolution exceeding a resolution limit.

CITATION LIST

Patent Literature

[Patent Literature 1] Japanese Unexamined Patent Publication No. 2015-99177
[Patent Literature 2] Japanese Unexamined Patent Publication No. H11-242189

Non-Patent Literature

[Non-Patent Literature 1] Shwetadwip Chowdhury, Al-Hafeez Dhalla, and Joseph Izatt, "Structured oblique illumination microscopy for enhanced resolution imaging of non-fluorescent, coherently scattering sample", 1 Aug. 2012/Vol. 3, No. 8/BIOMEDICAL OPTICS EXPRESS, pp. 1841-1854
[Non-Patent Literature 2] Thorsten Lang, Silvio O. Rizzoli, "Membrane Protein Clusters at Nanoscale Resolution: More Than Pretty Pictures", 1 Apr. 2010/Vol. 25, No. 2 PHYSIOLOGY, pp. 116-124

SUMMARY OF INVENTION

Technical Problem

The above-described structured illumination microscope includes a translation mechanism and/or a rotation mechanism of a diffraction grating. These mechanisms can change a phase and a stripe direction of structured illumination light. Thus, there is a problem in that a device configuration may be complicated.

An objective of an aspect of the present invention is to provide an image acquisition device, an image acquisition method, and a spatial light modulation unit in which a configuration is able to be simplified.

Solution to Problem

According to an aspect of the present invention, an image acquisition device for acquiring an image of an observation target by radiating structured illumination light includes a light source for outputting light; a spatial light modulator having a plurality of pixels two-dimensionally arranged and for modulating a phase of the light output from the light source for each of the plurality of pixels; an objective lens for radiating the modulated light to the observation target; a photodetector for capturing an image of the light from the observation target; and a control unit for controlling an amount of phase modulation for each of the plurality of pixels in accordance with a phase pattern in which phase values corresponding to the plurality of pixels are two-dimensionally distributed, wherein the phase pattern is a phase pattern generated based on a predetermined basic phase pattern, and wherein the basic phase pattern includes a first region in which the phase value continuously increases in a predetermined direction and a second region in which the phase value continuously decreases in the predetermined direction and facing the first region in the predetermined direction.

In the image acquisition device, the phase pattern is calculated based on the basic phase pattern including the first region in which the phase value continuously increases in the predetermined direction and the second region in which the phase value continuously decreases in the predetermined direction. It is possible to radiate stripe-like illumination light from the objective lens to the observation target by modulating the illumination light in the spatial light modulator in accordance with the phase pattern. In the image acquisition device, it is possible to change a phase and a stripe direction of the generated stripe-like light by changing the phase pattern input to the spatial light modulator. Thus, it is unnecessary to provide a movable mechanism for changing the phase and the stripe direction of the stripe-like light as in the conventional technology, and the movable mechanism can be omitted. Consequently, according to the image acquisition device, it is possible to simplify a configuration.

In the image acquisition device according to an aspect of the present invention, the phase value may linearly increase in the predetermined direction in the first region and the phase value may linearly decrease in the predetermined direction in the second region. Accordingly, because the basic phase pattern is simplified, it is possible to further simplify a configuration without having to use a complex optical element or the like for generating stripe-like light.

In the image acquisition device according to an aspect of the present invention, the basic phase pattern may be axisymmetric with respect to a straight line passing through a center in the predetermined direction and orthogonal to the predetermined direction. Accordingly, it is possible to obtain stripe-like light extended in an optical axis direction (a depth direction) of the objective lens.

In the image acquisition device according to an aspect of the present invention, the basic phase pattern may be non-axisymmetric with respect to a straight line passing through a center in the predetermined direction and orthogonal to the predetermined direction. Accordingly, it is possible to adjust an occurrence position or a depth and an amount of extension of a stripe in the stripe-like light.

In the image acquisition device according to an aspect of the present invention, the first region and the second region may be adjacent to each other and the phase values may be continuous at a boundary therebetween. Accordingly, because the basic phase pattern is simplified, it is possible to further simplify a configuration without using a complex optical element or the like for generating stripe-like light.

In the image acquisition device according to an aspect of the present invention, the basic phase pattern may further include a third region in which the phase value is constant. Accordingly, it is possible to generate three-dimensionally structured illumination light structured in an optical axis direction of the objective lens. It is possible to construct a three-dimensional super-resolution image by using the structured illumination light.

In the image acquisition device according to an aspect of the present invention, the third region may be arranged between the first region and the second region in the predetermined direction. In the image acquisition device according to an aspect of the present invention, the basic phase pattern may include two of the first regions, two of the second regions, and two of the third regions, and one of the third regions may be arranged between the first regions in the predetermined direction and the other of the third regions may be arranged between the second regions in the predetermined direction. In the image acquisition device according to an aspect of the present invention, the basic phase pattern may include two of the third regions, and one of the two third regions may be arranged at a side opposite to the second region in the predetermined direction with respect to the first region and the other of the two third regions may be arranged at a side opposite to the first region in the predetermined direction with respect to the second region. Accordingly, because the basic phase pattern is simplified, it is possible to further simplify a configuration without having to use a complex optical element or the like for generating stripe-like light.

In the image acquisition device according to an aspect of the present invention, the phase pattern may be a phase pattern in which a diffraction grating pattern of a diffraction grating shape and the basic phase pattern are superimposed on each other. Accordingly, it is possible to form the phase of the illumination light in the diffraction grating shape without providing a diffraction grating. Thus, it is possible to further simplify a configuration.

In the image acquisition device according to an aspect of the present invention, the phase pattern may be a phase pattern in which a lens pattern of a lens shape and the basic phase pattern are superimposed on each other. Accordingly, it is possible to form a phase of the illumination light in a lens shape without providing a lens element. Thus, it is possible to further simplify a configuration.

According to an aspect of the present invention, an image acquisition method of acquiring an image of an observation target by radiating structured illumination light includes a first step of modulating, by a spatial light modulator having a plurality of pixels two-dimensionally arranged, a phase of the light output from a light source for each of the plurality of pixels; and a second step of radiating the modulated light to the observation target and capturing an image of light from the observation target, wherein the first step includes controlling an amount of phase modulation for each of the plurality of pixels in accordance with a phase pattern generated based on a predetermined basic phase pattern and in which phase values corresponding to the plurality of pixels are two-dimensionally distributed, and wherein the basic phase pattern includes a first region in which the phase value continuously increases in a predetermined direction and a second region in which the phase value continuously decreases in the predetermined direction and facing the first region in the predetermined direction.

In the image acquisition method, the phase pattern is calculated based on the basic phase pattern including the first region in which the phase value continuously increases in the predetermined direction and the second region in which the phase value continuously decreases in the predetermined direction. It is possible to radiate stripe-like illumination light to the observation target by modulating the illumination light in the spatial light modulator in accordance with the phase pattern. In the image acquisition method, it is possible to change a phase and a stripe direction of the generated stripe-like light by changing the phase pattern input to the spatial light modulator. Thus, it is unnecessary to provide a movable mechanism for changing the phase and the stripe direction of the stripe-like light as in the conventional technology, and the movable mechanism can be omitted. Consequently, according to this image acquisition method, it is possible to simplify a configuration.

According to an aspect of the present invention, a spatial light modulation unit for use in a structured illumination microscope includes a spatial light modulator having a plurality of pixels two-dimensionally arranged and for modulate a phase of input light for each of the plurality of pixels and output the modulated light; and a control unit for control an amount of phase modulation for each of the plurality of pixels in accordance with a phase pattern in which phase values corresponding to the plurality of pixels are two-dimensionally distributed, wherein the phase pattern is a phase pattern generated based on a predetermined basic phase pattern, and wherein the basic phase pattern includes a first region in which the phase value continuously increases in a predetermined direction and a second region in which the phase value continuously decreases in the predetermined direction and facing the first region in the predetermined direction.

In the spatial light modulation unit, the phase pattern is calculated based on the basic phase pattern having the first region in which the phase value continuously increases in the predetermined direction and the second region in which the phase value continuously decreases in the predetermined direction. It is possible to radiate stripe-like illumination light to the observation target by modulating the illumination light in the spatial light modulator in accordance with the phase pattern. In the spatial light modulation unit, it is possible to change a phase and a stripe direction of the generated stripe-like light by changing the phase pattern input to the spatial light modulator. Thus, it is unnecessary to provide a movable mechanism for changing the phase and the stripe direction of the stripe-like light as in the conventional technology, and the movable mechanism can be omitted. Consequently, according to a structured illumination microscope using this spatial light modulation unit, it is possible to simplify a configuration.

Advantageous Effects of Invention

According to an aspect of the present invention, it is possible to provide an image acquisition device, an image acquisition method, and a spatial light modulation unit in which a configuration is able to be simplified.

BRIEF DESCRIPTION OF DRAWINGS

FIG. 5 is a conceptual diagram illustrating a method of constructing a super-resolution image.

FIG. 13 is a conceptual diagram illustrating stripe-like illumination light generated according to basic phase patterns of the fifth to seventh modified examples.

DESCRIPTION OF EMBODIMENTS

Hereinafter, embodiments of an image acquisition device and an image acquisition method of the present invention will be described in detail with reference to the drawings. In the following description, the same reference signs are used for the same or corresponding elements, and redundant description thereof will be omitted.

Figure 1:
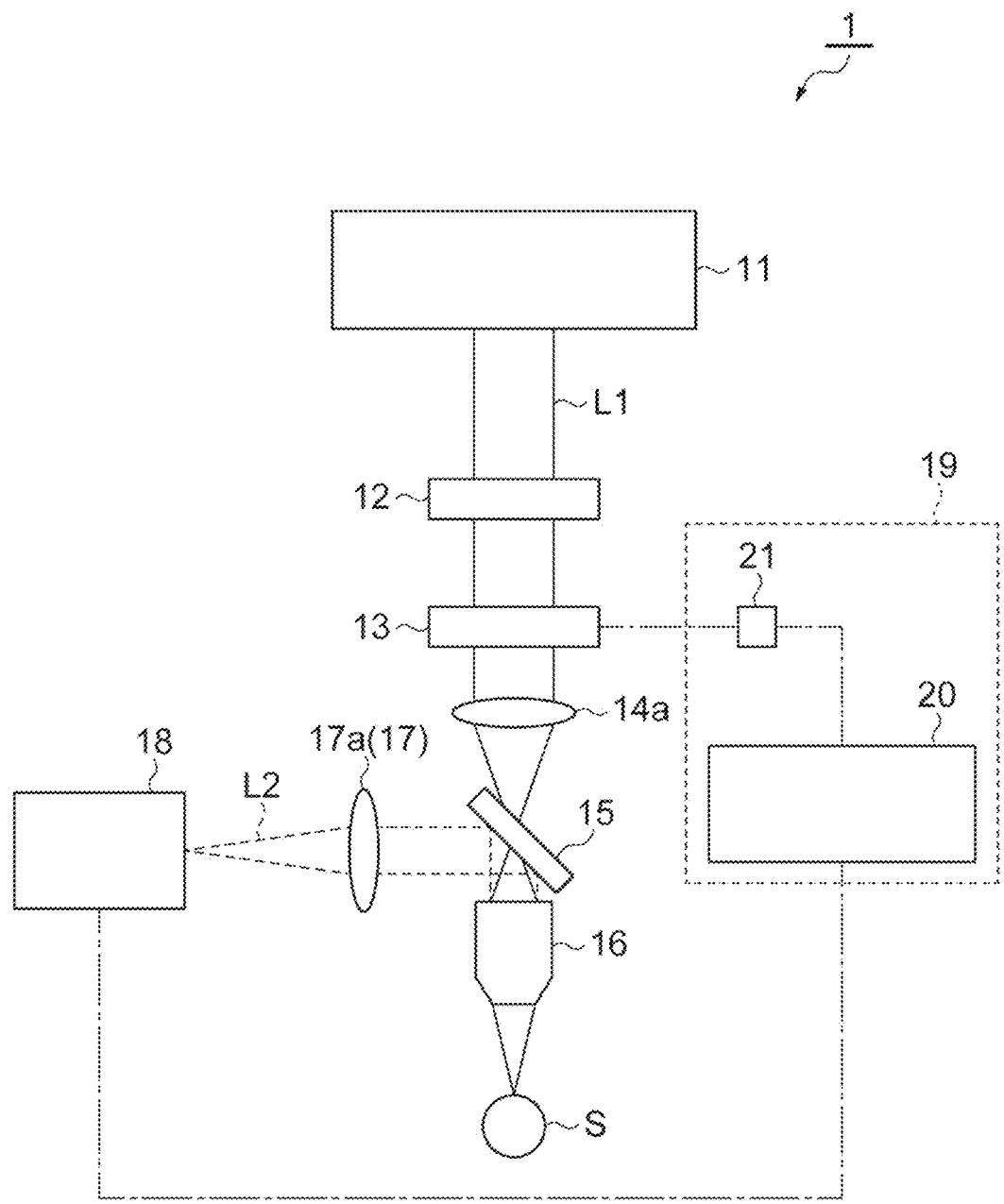
FIG. 1 is a block diagram illustrating a configuration of a structured illumination microscope which is an embodiment of an image acquisition device of the present invention.

A structured illumination microscope (an image acquiring device) 1 illustrated in FIG. 1 is a device configured to acquire an image of a sample (an observation target) S by radiating illumination light L1 to a surface of the sample S and imaging detection light L2 such as fluorescence or reflected light emitted from the sample S in association with the radiation. The illumination light L1 radiated to the sample S is stripe-like light (structured illumination light) having a predetermined periodic structure. In the structured illumination microscope 1, as will be described below, it is possible to construct a super-resolution image having a high resolution exceeding a resolution limit by changing a phase and a stripe direction of structured illumination light to acquire a plurality of images and performing predetermined calculation based on the images.

The sample S to be observed is, for example, a sample such as a biological cell or organism containing a fluorescent substance such as a fluorescent dye or a fluorescent gene. Also, the sample S may be a sample such as a semiconductor device or a film. For example, the sample S emits the detection light L2 such as fluorescence when light of a predetermined wavelength range (excitation light or illumination light) is radiated. For example, the sample S is accommodated in a holder having at least transparency to the illumination light L1 and the detection light L2. This holder is held on, for example, a stage.

As illustrated in FIG. 1, the structured illumination microscope 1 includes a light source 11, a collimator lens 12, a spatial light modulator (SLM) 13, a first optical system 14, a dichroic mirror 15, an objective lens 16, a second optical system 17, a photodetector 18, and a control unit 19.

The light source 11 outputs illumination light L1 including a wavelength for exciting the sample S. For example, the light source 11 emits coherent light or incoherent light. Examples of the coherent light source include a laser light source such as a laser diode (LD). Examples of the incoherent light source include a light emitting diode (LED), a super luminescent diode (SLD), a lamp system light source, and the like. As the laser light source, a light source configured to oscillate continuous waves is preferable and a light source configured to oscillate pulsed light such as ultrashort pulsed light may be used. As a light source configured to oscillate pulsed light, a unit in which a light source configured to output pulsed light and an optical shutter or an acousto-optic modulator (AOM) for pulse modulation are combined may be used. The light source 11 may be configured to output the illumination light L1 including a plurality of wavelength ranges. In this case, some of wavelengths of the illumination light L1 may be selectively transmitted by an optical filter such as an acousto-optic tunable filter.

The collimator lens 12 collimates the illumination light L1 output from the light source 11 and outputs the collimated illumination light L1. The SLM 13 is a phase modulation type spatial light modulator having a plurality of pixels two-dimensionally arranged and configured to modulate the phase of the illumination light L1 output from the light source 11 for each of the plurality of pixels. The SLM 13 modulates the illumination light L1 incident from the collimator lens 12 and outputs the modulated illumination light L1 to the first optical system 14 (a first step or a modulation step). The SLM 13 is configured as, for example, a transmission type or a reflection type. In FIG. 1, a transmission type SLM 13 is illustrated. The SLM 13 is, for example, a refractive index changing material type SLM (for example, a liquid crystal on silicon (LCOS) type SLM or a liquid crystal display (LCD)), a variable mirror type SLM (for example, a segment mirror type SLM or a continuous deformable mirror type SLM), an SLM using an electrical address type liquid crystal element or an optical address type liquid crystal element, or the like. The SLM 13 is electrically connected to the controller 21 of the control unit 19 and constitutes a spatial light modulation unit. The driving of the SLM 13 is controlled by the controller 21 of the control unit 19. Details of the control of the SLM 13 by the control unit 19 will be described below.

The first optical system 14 optically couples the SLM 13 and the objective lens 16 so that the illumination light L1 output from the SLM 13 is guided to the objective lens 16. Here, the first optical system 14 includes a lens 14a for focusing the illumination light L1 from the SLM 13 on the pupil of the objective lens 16.

The dichroic mirror 15 is an optical element for separating the illumination light L1 and the detection light L2. For example, the dichroic mirror 15 is configured to transmit the illumination light L1 of an excitation wavelength and reflect the detection light L2 of a fluorescence wavelength. Also, instead of the dichroic mirror 15, a polarizing beam splitter may be used. According to types of optical systems before and after the dichroic mirror 15 (for example, the first optical system 14 and the second optical system 17) or a type of microscope to be applied, the dichroic mirror 15 may be configured to reflect the illumination light L1 and transmit the detection light L2 of the fluorescence wavelength.

The objective lens 16 focuses the illumination light L1 modulated by the SLM 13 to irradiate the sample S with the illumination light L1 and guides the detection light L2 emitted from the sample S in association with the irradiation (a second step). The objective lens 16 is configured to be movable along its optical axis by a driving element such as a piezoelectric actuator or a stepping motor. Thereby, the light focus position of the illumination light L1 and the light focus position for detecting the detection light L2 can be adjusted.

The second optical system 17 optically couples the objective lens 16 and the photodetector 18 so that an image of the detection light L2 guided from the objective lens 16 is formed by the photodetector 18. The second optical system 17 has a lens 17a for forming the image of the detection light L2 from the objective lens 16 on the light receiving surface of the photodetector 18.

The photodetector 18 images the detection light L2 guided by the objective lens 16 and of which an image is formed on the light receiving surface (the second step or an imaging step). The photodetector 18 is, for example, an area image sensor such as a CCD image sensor or a CMOS image sensor.

The control unit 19 includes a computer 20 including a processor, a memory, and the like, and a controller 21 including a processor, a memory, and the like. The computer 20 is, for example, a personal computer or a smart device, and by the processor, controls the operations of the objective lens 16, the photodetector 18, and the like, and executes various types of control.

Figure 2:
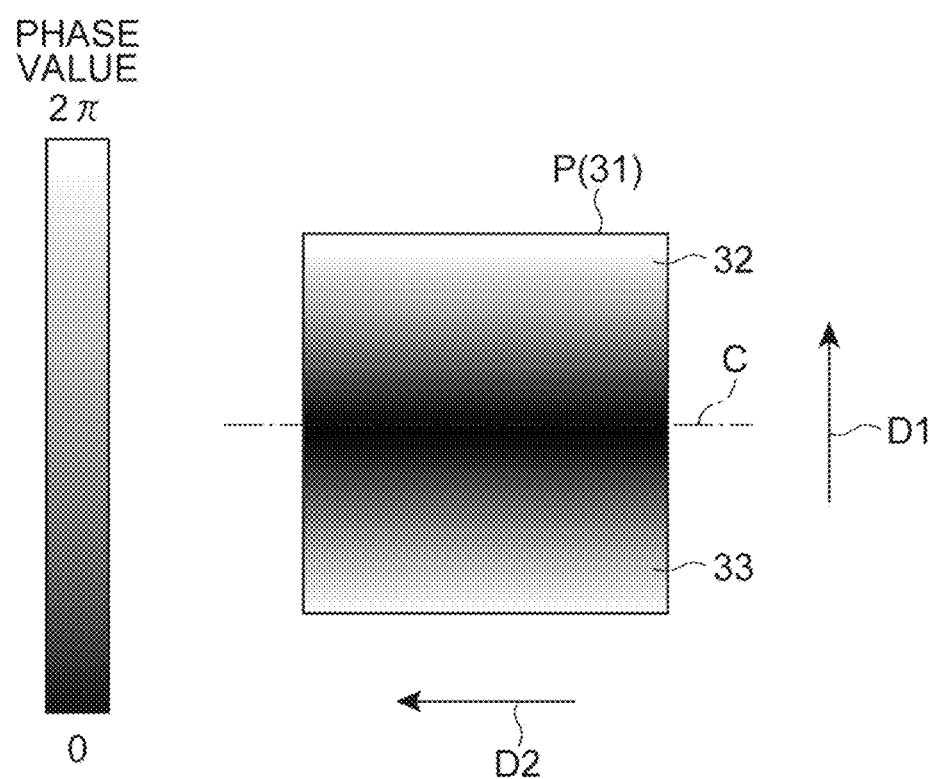
FIG. 2 is a diagram illustrating a basic phase pattern used in the light-sheet microscope of FIG. 1.

The controller 21 is electrically connected to the computer 20, and controls an amount of phase modulation for each of the plurality of pixels in the SLM 13 in accordance with a two-dimensional phase pattern P as illustrated in FIG. 2. The phase pattern P is a pattern of phase values related to positions on a two-dimensional plane and the positions in the phase pattern P correspond to a plurality of pixels of the SLM 13. A phase value of the phase pattern P is defined between 0 and 2π radians. In FIG. 2, the phase value in each part of the phase pattern P is represented by a color depth. Also, an upper limit of the phase value of the phase pattern P may be larger than 2π radians.

For each pixel of the SLM 13, the controller 21 controls the amount of phase modulation of the pixel in accordance with the phase value at the position corresponding to the pixel in the phase pattern P. Specifically, for example, within the controller 21, a D/A conversion unit (a digital/analog converter) such as a digital video interface (DVI) configured to convert a phase value of a phase pattern P input as digital data into a driving voltage value to be applied to each pixel is provided. When the phase pattern P is input from the computer 20 to the controller 21, the controller 21 converts the phase value of the phase pattern P into the driving voltage value by using the D/A conversion unit and inputs the driving voltage value to the SLM 13. The SLM 13 applies a voltage to each pixel in accordance with the input driving voltage value. For example, the SLM 13 may include a D/A conversion unit, and the controller 21 may input digital data according to the phase pattern P to the SLM 13. In this case, the phase value of the phase pattern P is converted into the driving voltage value by the D/A conversion unit of the SLM 13. Also, instead of performing the D/A conversion, the SLM 13 may control a voltage value to be applied to each pixel based on the digital signal output from the controller 21.

The phase pattern P is calculated by the computer 20 of the control unit 21 based on the predetermined basic phase pattern 31. For example, the basic phase pattern 31 may be pre-stored in the memory of the computer 20. By modulating the illumination light L1 with the SLM 13 in accordance with the phase pattern P calculated based on the basic phase pattern 31, it is possible to radiate the stripe-like illumination light L1 from the objective lens 16. Although the phase pattern P may be calculated by further superimposing another pattern on the basic phase pattern 31 as will be described below, a case in which the basic phase pattern 31 used as the phase pattern P as it is will be described hereinafter.

As illustrated in FIG. 2, for example, the basic phase pattern 31 is set within a rectangular range. The basic phase pattern 31 has a rectangular first region 32 in which the phase value continuously increases in a predetermined direction D1 and a rectangular second region 33 facing the first region 32 in the direction D1 and in which the phase value continuously decreases in the direction D1. That is, in the first region 32 and the second region 33, the directions in which the phase value increases and decreases are opposite to each other. The fact that the "phase value continuously increases" in a certain region indicates that the phase values are continuous without interruption across the entire region. Also, a case in which the phase value is 0 radians and a case in which the phase value is 2π radians indicate the same state, and the phase value is continuous even if the phase value varies between 0 radians and 2π radians.

In the first region 32, the phase value linearly increases in the direction D1. In the second region 33, the phase value linearly decreases in the direction D1. In both of the first region 32 and the second region 33, the phase value changes by 2π radians. That is, an absolute value of a gradient (a rate of increase) of the phase value in the first region 32 is equal to an absolute value of a gradient (a rate of decrease) of the phase value in the second region 33. In both of the first region 32 and the second region 33, the phase value is constant in a direction D2 orthogonal to the direction D1. The first region 32 and the second region 33 are adjacent to each other and the phase value is continuous at a boundary therebetween. In this example, the phase value at the boundary is 0 radians. The basic phase pattern 31 is axisymmetric with respect to a straight line (a central line) C passing through the center in the direction D1 and orthogonal to the direction D1. In this example, the boundary between the first region 32 and the second region 33 is located on the central line C.

Figure 3:
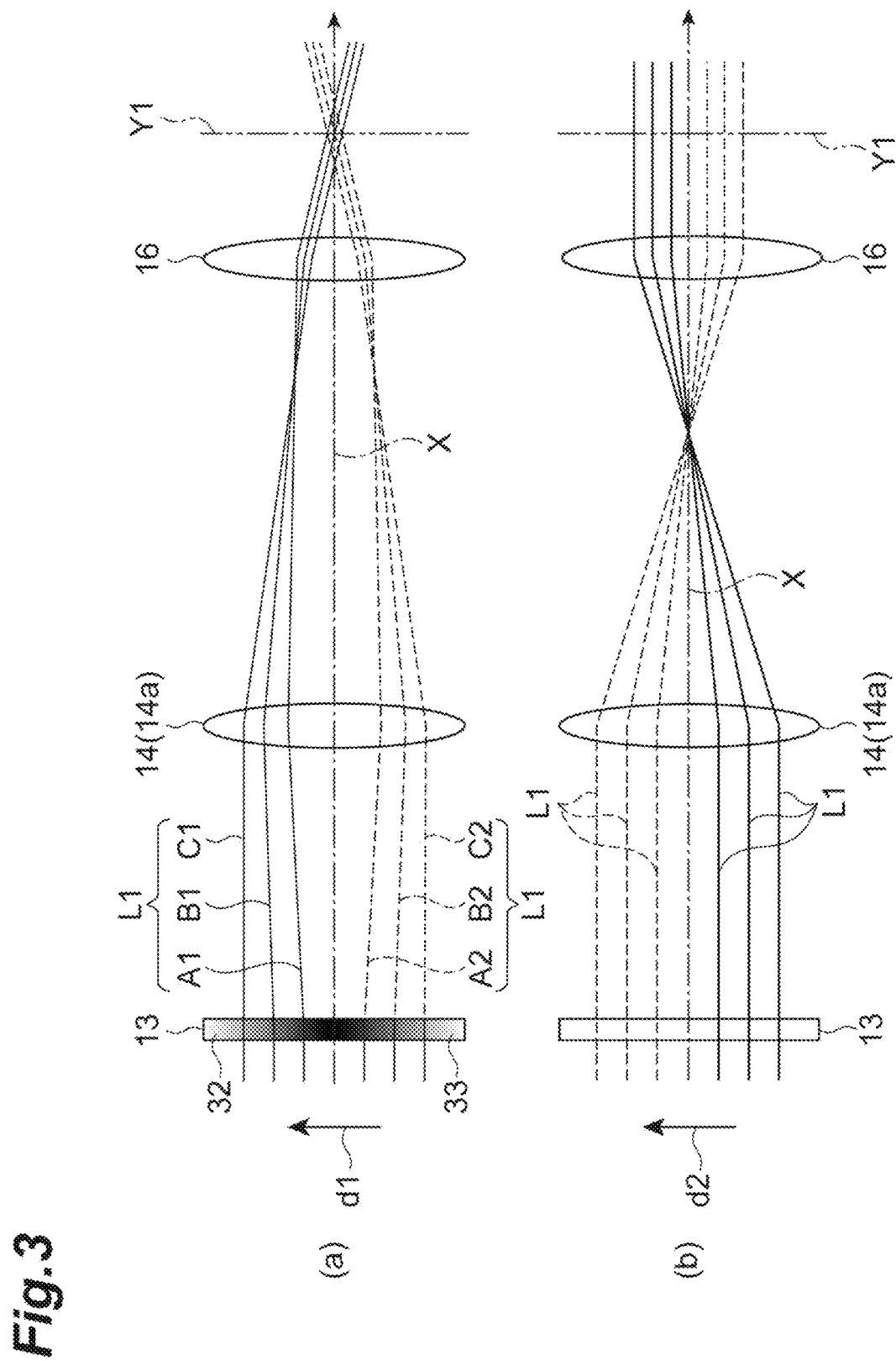
FIG. 3 is a conceptual diagram illustrating a state in which stripe-like illumination light is generated.

FIG. 3 is a conceptual diagram illustrating a state in which stripe-like illumination light L1 is generated by the illumination light L1 modulated by the SLM 13 in accordance with the basic phase pattern 31. FIG. 3(a) is a diagram illustrating an optical path of the illumination light L1 when viewed from a direction d2 corresponding to a direction D2 and FIG. 3(b) is a diagram illustrating an optical path of the illumination light L1 when viewed from a direction d1 corresponding to a direction D1. In FIG. 3(a), three pieces of illumination light A1, B1, and C1 in ascending order of distances from an optical axis X of the objective lens 16 are illustrated as an example of the optical path of the illumination light L1 incident on the first region 32. Also, three pieces of illumination light A2, B2, and C2 in ascending order of distances from the optical axis X are illustrated as an example of the optical path of the illumination light L1 incident on the second region 33.

Figure 4:
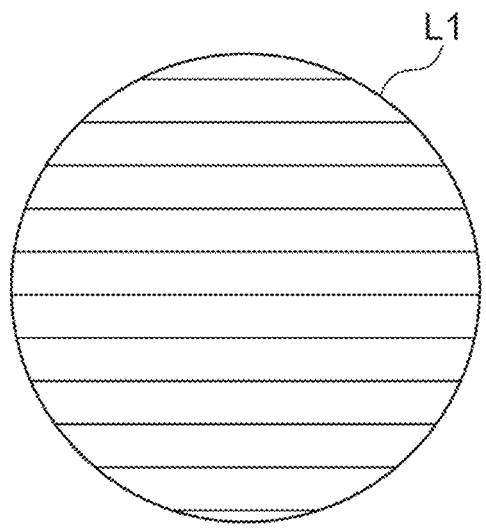
FIG. 4 is a conceptual diagram illustrating generated stripe-like illumination light.

As illustrated in FIG. 3(a), phases of the illumination light A1 and A2 are delayed by a predetermined amount in the SLM 13. Amounts of phase delay in the illumination light B1 and B2 in the SLM 13 are larger than those in the illumination light A1 and A2. Amounts of phase delay in the illumination light C1 and C2 in the SLM 13 are smaller than that in the illumination light A1 and A2, and phases thereof do not substantially change in the SLM 13. As illustrated in FIG. 3(b), when viewed from a direction d1, the phase of the illumination light L1 does not change in the SLM 13. In the above manner, stripe-like illumination light L1 as illustrated in FIG. 4 is generated at a position along a straight line Y1 of FIG. 3. In this example, the stripe-like illumination light L1 is generated along a plane orthogonal to the optical axis X.

In the structured illumination microscope 1, by changing the phase pattern P to be input to the SLM 13, it is possible to control the phase and the stripe direction of the stripe-like illumination light L1 to be generated. For example, by changing an offset value (an initial phase value) of the phase value in the first region 32 and the second region 33, it is possible to change the phase of the stripe-like illumination light L1 to be generated. Also, for example, by changing an angle of a direction D1 in which the phase value changes in the first region 32 and the second region 33, the stripe direction of the illumination light L1 to be generated can be changed.

Next, a method of constructing a super-resolution image based on the structured illumination microscope 1 will be described. For example, a basic principle of a structured illumination method is described in the following Reference Literature 1.

(Reference Literature 1) Yoshiaki Oikawa, Technology and Application of Super-Resolution Microscope, Microscope Vol. 47, No. 4, 2012

In the structured illumination method, the sample S is irradiated with stripe-like illumination light L1 having a certain known spatial frequency. When the stripe-like illumination light L1 is radiated to a microstructure that cannot be resolved by a conventional microscope, a pattern (moire) with a low spatial frequency appears. Here, if a spatial frequency of the microstructure of the sample S is V1, a spatial frequency of the illumination light L1 is V2, and a spatial frequency of the moire is V3, the relationship of the following Equation (1) is established.

$$V1=V2+V3 \quad (1)$$

Here, because V2 is known and the spatial frequency V3 of the moire can be read from the image, the spatial frequency V1 of the sample S can be calculated from V2 and V3.

Furthermore, by using the images acquired by changing the phase and the stripe direction of the stripe-like illumination light L1, it is possible to mutually separate a low-frequency component resolvable in the conventional microscope and a super-resolution component (a high-frequency component) included in the moire. For example, as illustrated in FIG. 5, if three different directions having an angle difference of 120 degrees are assumed to be a first direction S1, a second direction S2, and a third direction S3, nine images of the sample S irradiated with illumination light of three pieces of stripe-like illumination light P1, P2, and P3 having stripe directions matching the first direction S1 and different phases, three pieces of stripe-like illumination light Q1, Q2, and Q3 having stripe directions matching the second direction S2 and different phases, and three pieces of stripe-like illumination light R1, R2, and R3 having stripe directions matching the third direction S3 and different phases are acquired.

Figure 6:
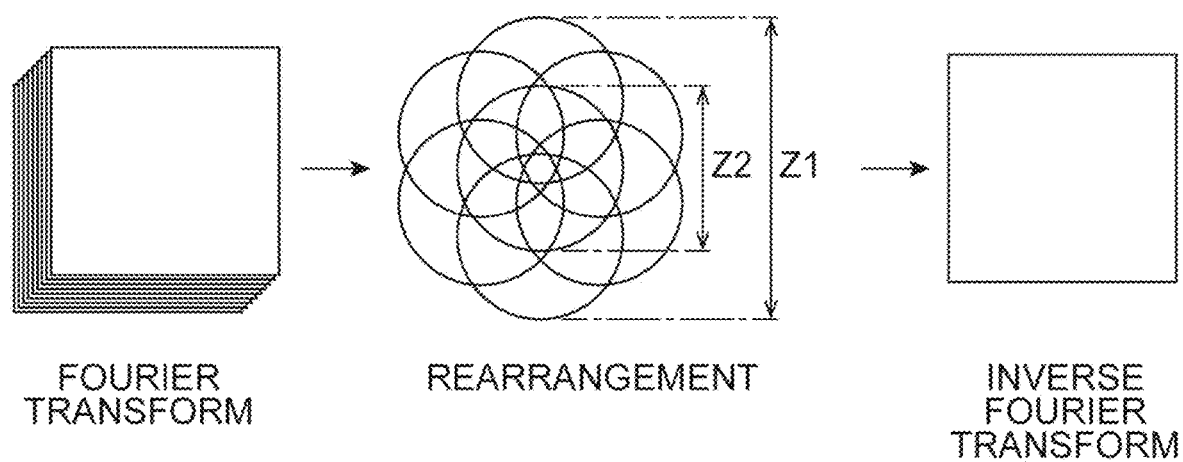
FIG. 6 is a conceptual diagram illustrating a method of constructing a super-resolution image.

Subsequently, as illustrated in FIG. 6, the nine images are subjected to a Fourier transform and the nine images are converted into Fourier images in a frequency space. Subsequently, the super-resolution component of the Fourier image is rearranged at a position of the original spatial frequency in the frequency space. Thereby, a range Z1 of the spatial frequency to be represented is expanded to twice a conventional spatial frequency range Z2. Subsequently, the image obtained by the rearrangement is subjected to an inverse Fourier transform. In this manner, it is possible to construct a super-resolution image in a real space.

As described above, in the structured illumination microscope 1, the phase pattern P is calculated based on the basic phase pattern 31 having the first region 32 in which the phase value continuously increases in the direction D1 and the second region 33 in which the phase value continuously decreases in the direction D1. By modulating the illumination light L1 in the SLM 13 in accordance with the phase pattern P, stripe-like illumination light L1 can be radiated from the objective lens 16 to the sample S. In the structured illumination microscope 1, it is possible to change the phase and the stripe direction of the stripe-like illumination light L1 to be generated by changing the phase pattern P input to the SLM 13. Thus, it is unnecessary to provide a movable mechanism for changing the phase and the stripe direction of the stripe-like illumination light L1 as in the conventional technology, and the movable mechanism can be omitted. Consequently, according to the structured illumination microscope 1, it is possible to simplify a configuration.

In the structured illumination microscope 1, the phase value linearly increases in the direction D1 in the first region 32 and the phase value linearly decreases in the direction D1 in the second region 33. Thereby, because the basic phase pattern 31 is simplified, it is possible to further simplify a configuration without having to use a complex optical element or the like for generating the stripe-like illumination light L1. That is, if the phase value does not linearly increase in the direction D1 in at least one of the first region 32 and the second region 33, there is a problem in that the first optical system 14 for generating the stripe-like illumination light L1 or an optical system such as the objective lens 16 may be complicated. On the other hand, in the structured illumination microscope 1, the configuration of the optical system for generating the stripe-like illumination light L1 is simplified because the phase value linearly increases in the direction D1 in both the first region 32 and the second region 33.

In the structured illumination microscope 1, the basic phase pattern 31 is axisymmetric with respect to the straight line C. Thereby, it is possible to obtain stripe-like light extending in a direction (a depth direction) along the optical axis X of the objective lens 16. Also, in the structured illumination microscope 1, the basic phase pattern 31 is bilaterally symmetrical (axisymmetric with respect to a straight line passing through the center in the direction D2 and orthogonal to the direction D2). Thereby, it is possible to alleviate an influence of scattering due to a self-healing effect and generate the illumination light L1 reaching not only a surface of the sample S but also a deep portion.

In the structured illumination microscope 1, the first region 32 and the second region 33 are adjacent to each other and the phase values are continuous at a boundary therebetween. Thereby, because the basic phase pattern 31 is simplified, it is possible to further simplify a configuration without having to use a complex optical element or the like for generating the stripe-like illumination light L1.

Figure 7:
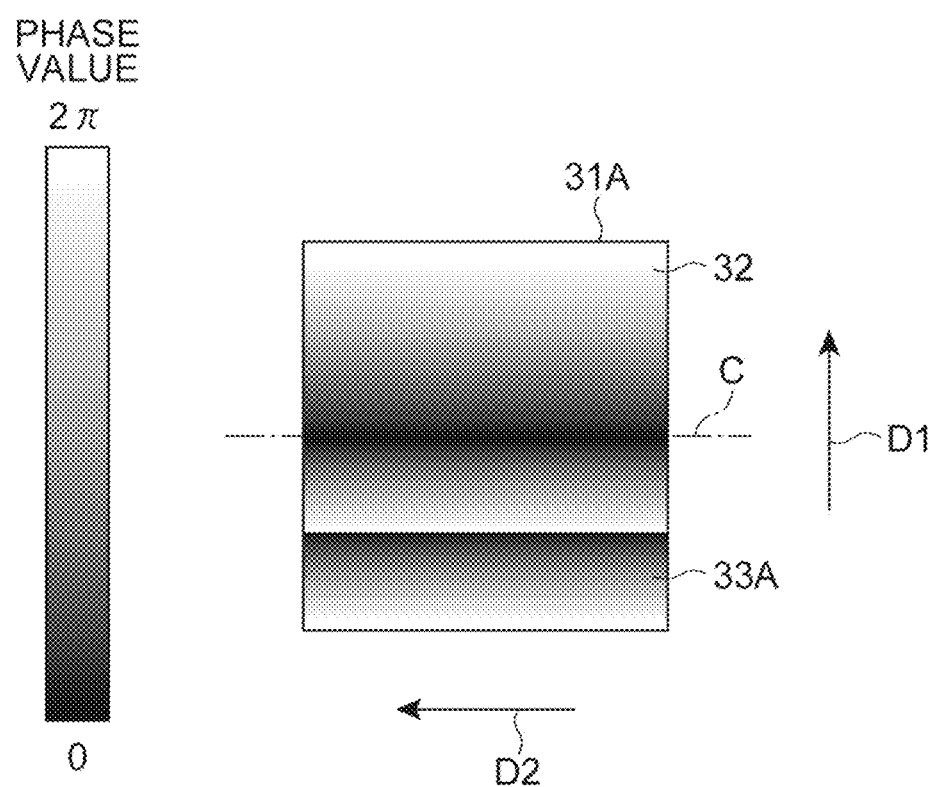
FIG. 7 is a diagram illustrating a first modified example of a basic phase pattern.

Although preferred embodiments of the present invention have been described above, the present invention is not limited to the above embodiments. For example, a basic phase pattern 31A of the first modified example illustrated in FIG. 7 may be used. In a second region 33A of the basic phase pattern 31A, the phase value linearly decreases by 4π radians in the direction D1. That is, an absolute value of a gradient of the phase value in the first region 32 is different from an absolute value of a gradient in the second region 33A. The basic phase pattern 31A is non-axisymmetric with respect to the central line C. Also, in this example, the boundary between the first region 32 and the second region 33A is located on the central line C.

Figure 8:
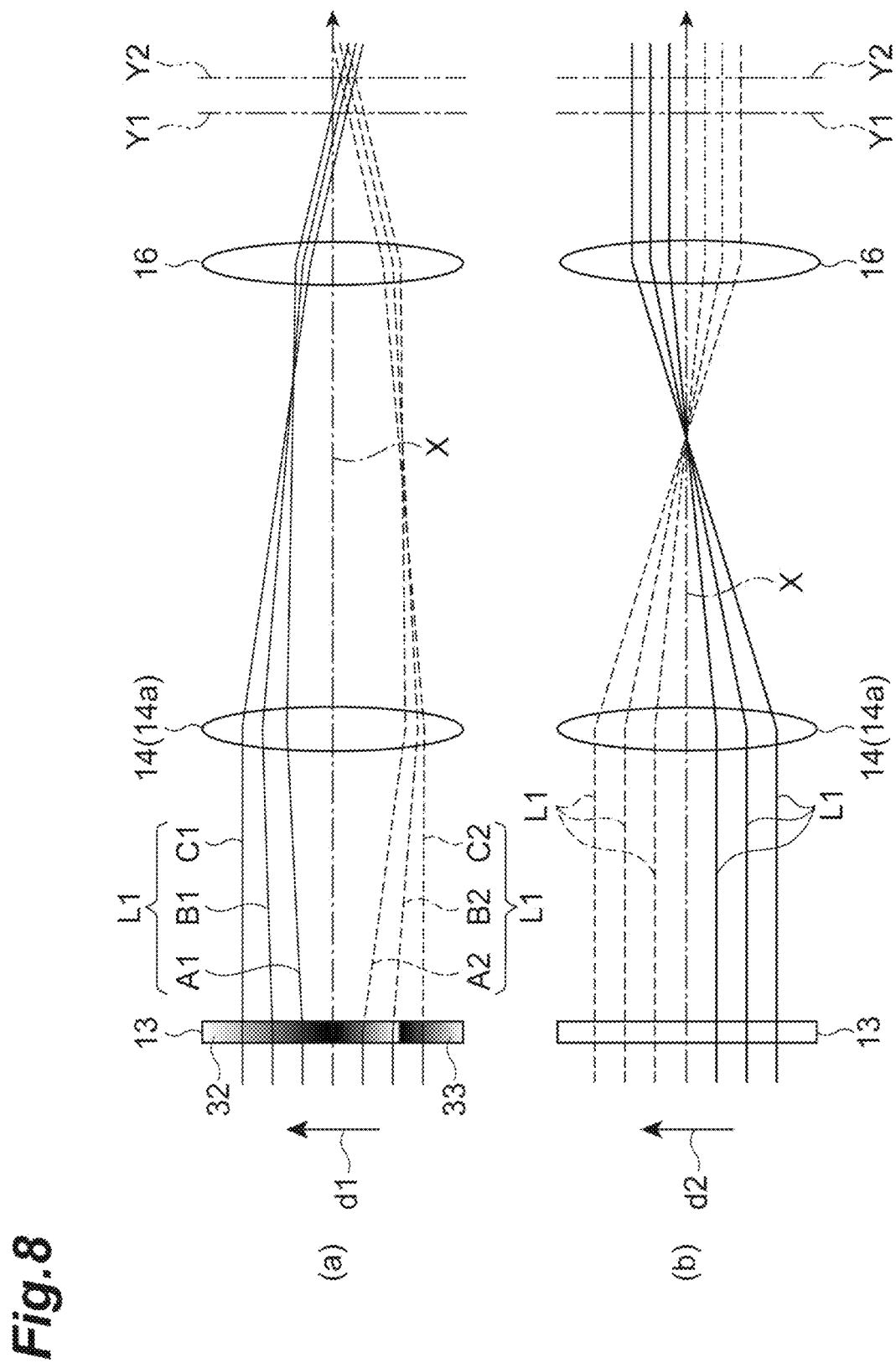
FIG. 8 is a conceptual diagram illustrating a state in which stripe-like light is generated using the basic phase pattern of the first modified example.

Even when such a basic phase pattern 31A is used, the illumination light L1 is modulated by the SLM 13 according to the basic phase pattern 31A as illustrated in FIG. 8, so that stripe-like illumination light L1 is generated. In this case, as illustrated in FIG. 8(a), an amount of phase delay in the illumination light A2 incident on the second region 33A in the SLM 13 is larger than that in the illumination light A1 incident on the first region 32. Likewise, an amount of phase delay in the illumination light B2 in the SLM 13 is larger than that in the illumination light B1 and an amount of phase delay in the illumination light C2 in the SLM 13 is larger than that in the illumination light C1. Thereby, stripe-like illumination light L1 is generated at a position along the straight line Y2 of FIG. 8 unlike the case of the above embodiment. Also in this case, the stripe-like illumination light L1 is generated along a plane orthogonal to the optical axis X.

As described above, in the first modified example, as in the case of the above embodiment, it is also possible to radiate stripe-like illumination light L1 from the objective lens 16 to the sample S and simplify the configuration. In the first modified example, because the basic phase pattern 31 is non-axisymmetric with respect to the straight line C, it is possible to adjust an occurrence position, a depth, and an amount of extension of a stripe in the stripe-like light.

Figure 9:
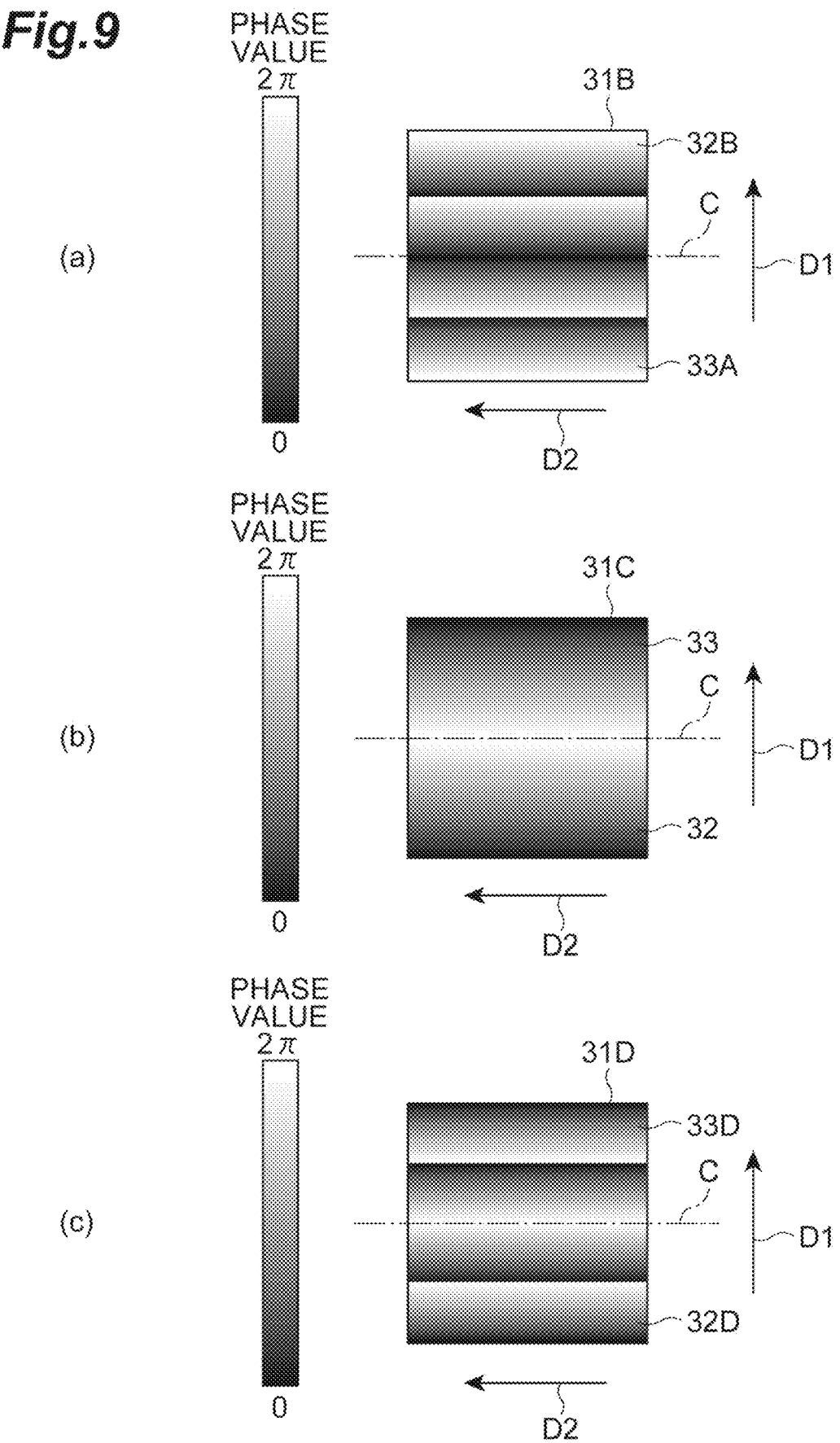
FIG. 9 is a diagram illustrating second to fourth modified examples of the basic phase pattern.

A basic phase pattern 31B of a second modified example, a basic phase pattern 31C of a third modified example, or a basic phase pattern 31D of a fourth modified example illustrated in FIG. 9 may be used. In the first region 32B of the basic phase pattern 31B, the phase value linearly increases by 4π radians in the direction D1. That is, an absolute value of a gradient of the phase value in the first region 32B is equal to an absolute value of a gradient of the phase value in the second region 33A.

In the basic phase pattern 31C, a positional relationship between a first region 32 and a second region 33 in the direction D1 is opposite to that in the above-described embodiment. That is, in the above-described basic phase pattern 31, the phase value increases as the distance from the boundary (the central line C) increases in the first region 32 and the phase value decreases as the distance from the boundary decreases in the second region 33. On the other hand, in the above-described basic phase pattern 31C, the phase value increases as the distance from the boundary decreases in the first region 32 and the phase value decreases as the distance from the boundary increases in the second region 33.

In the basic phase pattern 31D, as in the above-described third modified example, a positional relationship between a first region 32D and a second region 33D in the direction D1 is opposite to that in the above-described embodiment. Further, in the basic phase pattern 31D, the phase value linearly increases by 4π radians in the direction D1 in the first region 32D and the phase value linearly decreases by 4π radians in the direction D1 in the second region 33D. The basic phase patterns 31B to 31D are axisymmetric with respect to the central line C. Also in the basic phase patterns 31B to 31D, the boundary between the first region 32 and the second region 33A is located on the central line C.

Even when these basic phase patterns 31B to 31D are used, it is possible to irradiate the sample S with the stripe-like illumination light L1 from the objective lens 16 and it is possible to simplify a configuration as in the case of the above-described embodiment.

Figure 10:
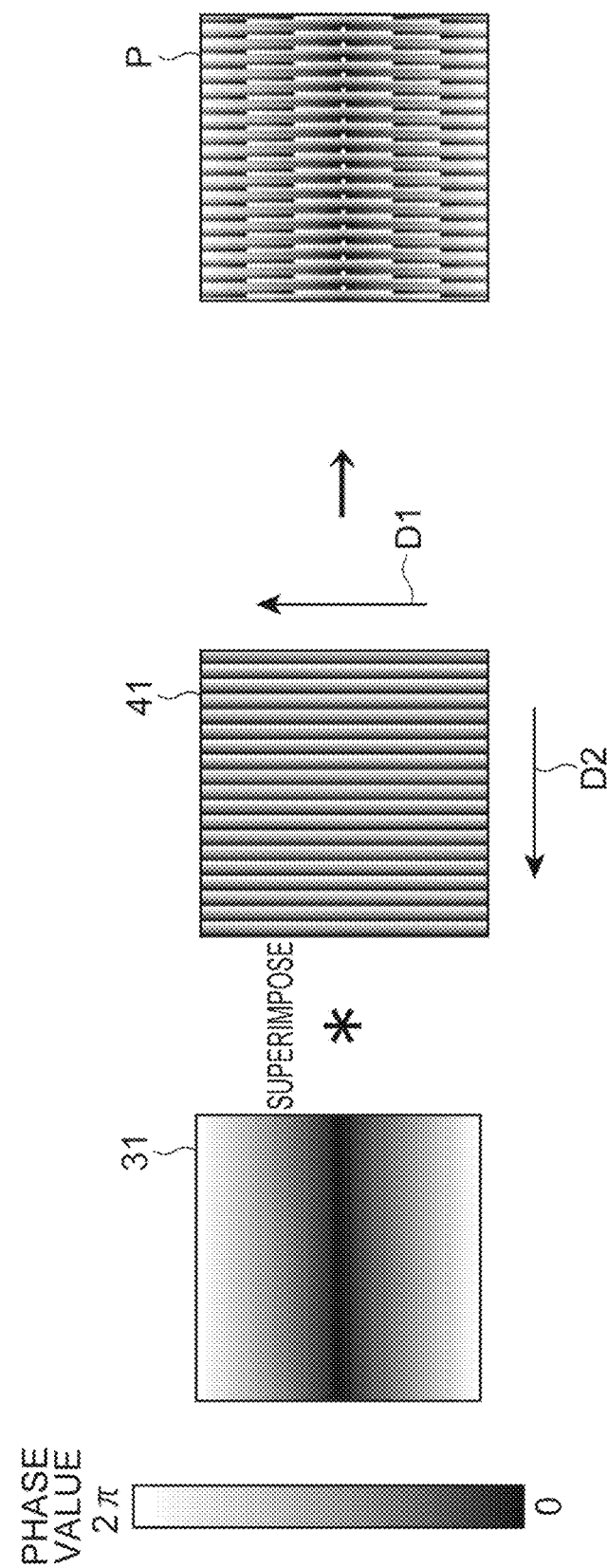
FIG. 10 is a diagram illustrating a state in which a diffraction grating pattern is superimposed on the basic phase pattern.
Figure 11:
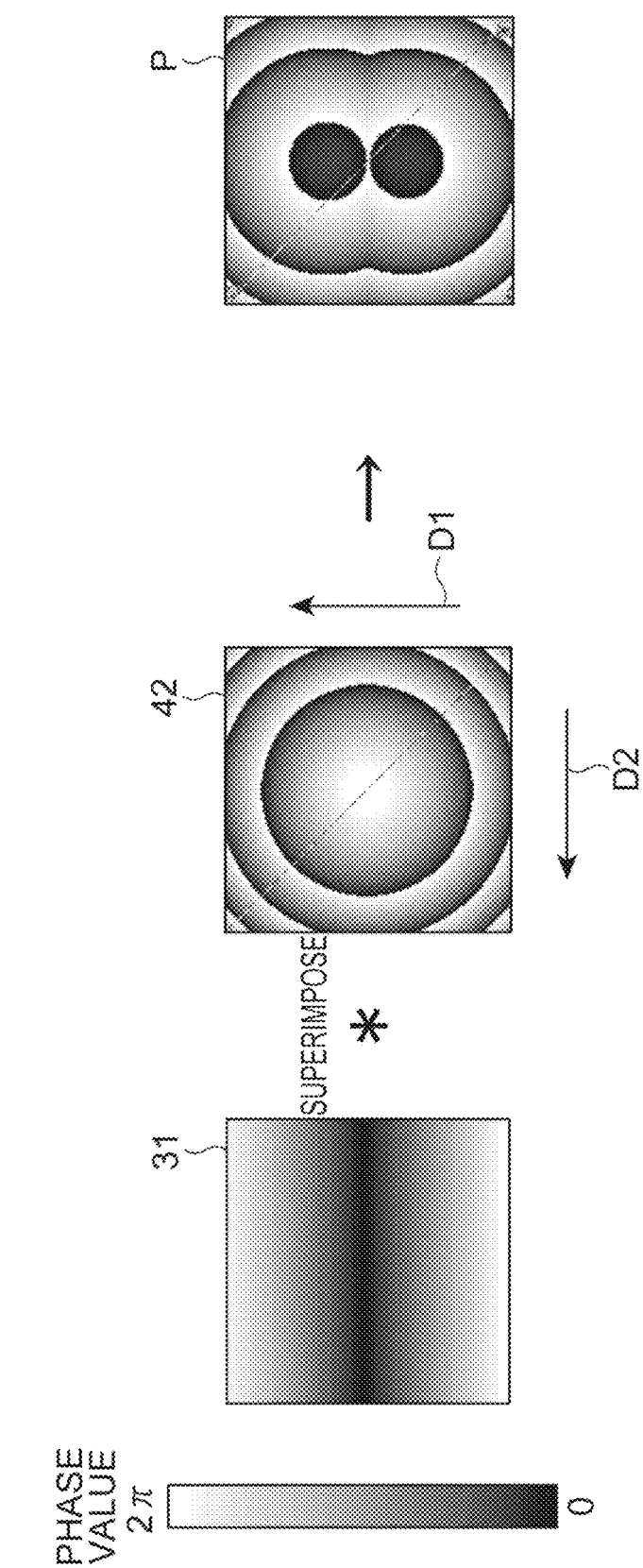
FIG. 11 is a diagram illustrating a state in which a lens pattern is superimposed on the basic phase pattern.

As illustrated in FIG. 10, the phase pattern P may be calculated by superimposing a diffraction grating pattern 41 of a diffraction grating shape on the basic phase pattern 31. The diffraction grating pattern 41 has the diffraction grating shape in the direction D2. Also, as illustrated in FIG. 11, for example, the phase pattern P may be calculated by superimposing a lens-like lens pattern 42 such as a Fresnel lens on the basic phase pattern 31. Also, the phase pattern P may be calculated by superimposing the diffraction grating pattern 41 or the lens pattern 42 on the basic phase patterns 31A to 31C.

In these cases, as in the case of the above-described embodiment, it is also possible to irradiate the sample S with stripe-like illumination light L1 from the objective lens 16 and it is also possible to simplify a configuration. Also, it is possible to form a phase of the illumination light in a diffraction grating shape or a lens shape without providing a diffraction grating element or a lens element. Thus, it is possible to further simplify a configuration.

Figure 12:
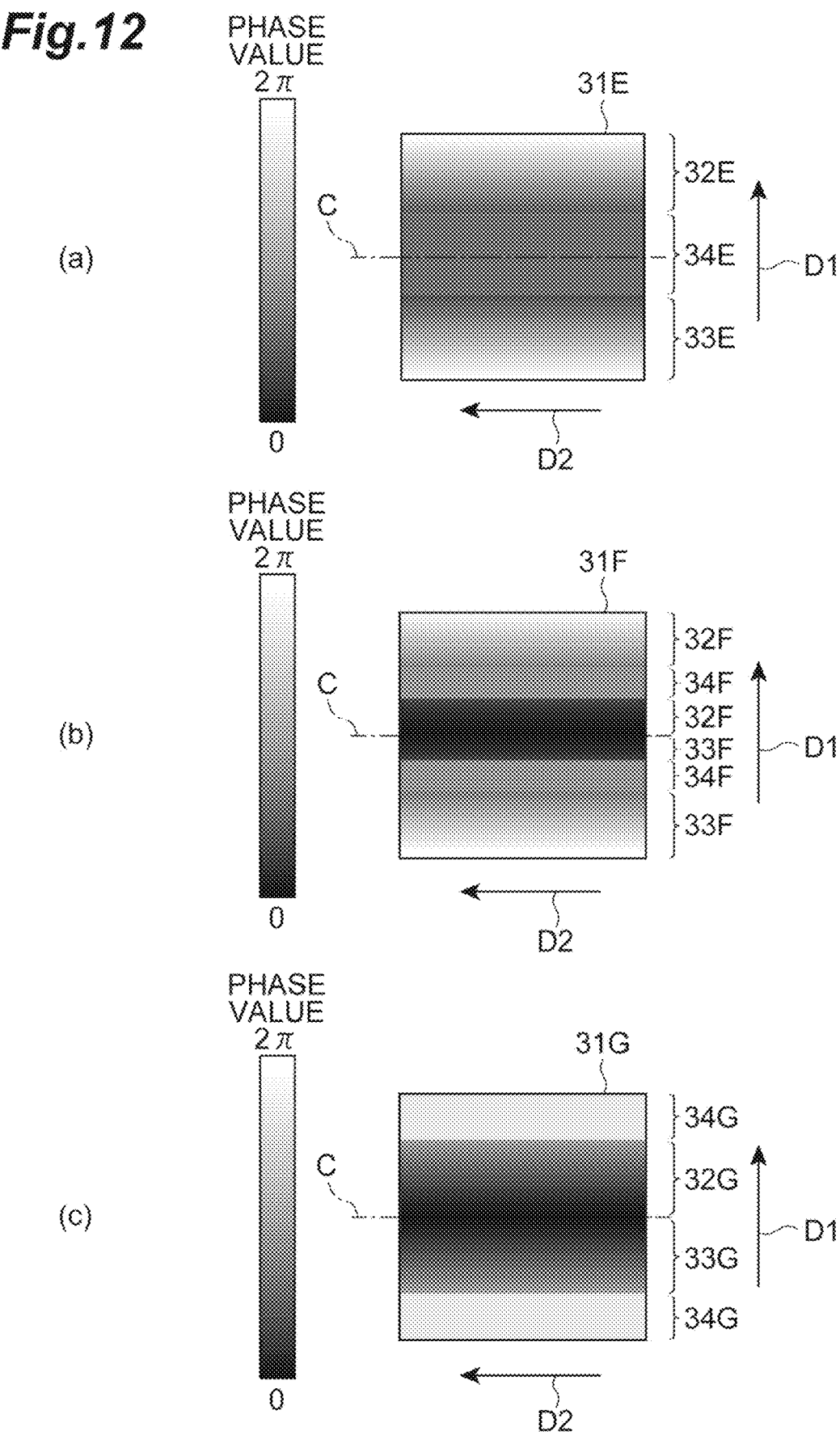
FIG. 12 is a diagram illustrating fifth to seventh modified examples of the basic phase pattern.

A basic phase pattern 31E of a fifth modified example, a basic phase pattern 31F of a sixth modified example, or a basic phase pattern 31G of a seventh modified example illustrated in FIG. 12 may be used. The basic phase patterns 31E, 31F, and 31G have third regions 34E, 34F, and 34G having constant phase values in addition to the first regions 32E, 32F, and 32G and the second regions 33E, 33F, and 33G. The first regions 32E, 32F, and 32G and the second regions 33E, 33F, and 33G are the same as corresponding parts in the first region 32 and the second region 33 of the above embodiment. That is, portions obtained by excluding the third regions 34E, 34F, and 34G from the first regions 32 and the second regions 33 become the first regions 32E, 32F, and 32G and the second regions 33E, 33F, and 33G.

The basic phase pattern 31E has the first region 32E, the second region 33E, and the third region 34E. The third region 34E is rectangular and arranged between the first region 32E and the second region 33E in the direction D1. The phase values are continuous at each of a boundary between the first region 32E and the third region 34E and a boundary between the second region 33E and the third region 34E.

The basic phase pattern 31F has two first regions 32F and 32F, two second regions 33F and 33F, and two third regions 34F and 34F. One of the third regions 34F and 34F is arranged between the first regions 32F and 32F in the direction D1 and the other of the third regions 34F and 34F is arranged between the second regions 33F and 33F in the direction D1. In the regions of the first region 32F and the third region 34F, the phase values are discontinuous. At the boundary between the second region 33F and the third region 34F, the phase values are continuous.

The basic phase pattern 31G has two third regions 34G and 34G. In the basic phase pattern 31G, one of the third regions 34G and 34G is arranged at a side opposite to the second region 33G in the direction D1 with respect to the first region 32G and the other of the third regions 34G and 34G is arranged at a side opposite to the first region 32G in the direction D1 with respect to the second region 33G. In this example, the third regions 34G and 34G are arranged at both ends of the direction D1 in the basic phase pattern 31G. The phase values are continuous at each of the boundary between the first region 32G and the third region 34G and the boundary between the second region 33G and the third region 34G. The basic phase patterns 31E to 31G are axisymmetric with respect to the central line C.

With respect to such basic phase patterns 31E to 31G, as in the above embodiment, it is possible to radiate stripe-like illumination light L1 from the objective lens 16 to the sample S and simplify the configuration. Also, because the basic phase patterns 31E to 31G are simplified, it is possible to further simplify a configuration without having to use a complicated optical element or the like for generating the stripe-like light.

Further, according to the basic phase patterns 31E to 31G, three-dimensional structured illumination light structured in a direction (an optical axis direction) along the optical axis X of the objective lens 16 can be generated. That is, if the basic phase patterns 31E to 31G having the third regions 34E, 34F, and 34G with constant phase values are used, stripe-like illumination light L1 in which gaps 51 are formed at regular intervals on stripes is generated as illustrated in FIG. 13(a), for example, at a first position in the optical axis direction. On the other hand, as illustrated in FIG. 13(b), at the second position different from the first position in the optical axis direction, stripe-like illumination light L1 in which gaps 52 are formed at positions different from those in the case of FIG. 13(a) is generated. In this manner, when the basic phase patterns 31E to 31G are used, the phase of the illumination light L1 generated in accordance with the position in the optical axis direction of the objective lens 16 changes and three-dimensional structured illumination light structured in the optical axis direction can be generated.

Three-dimensional super-resolution images can be constructed by using this three-dimensional structured illumination light. That is, for example, by moving a focal position of the objective lens 16 in the optical axis direction, images of the sample S are acquired at a plurality of positions in the optical axis direction. At this time, at the positions, for example, as in the case of the above embodiment, a plurality of images are acquired by changing the phase and the stripe direction. By combining two-dimensional super-resolution images at positions constructed based on the plurality of acquired images (integrating them in directions in three dimensions), it is also possible to construct a three-dimensional super-resolution image structured in the optical axis direction.

Alternatively, as a method of constructing a three-dimensional super-resolution image, a method described in the following Reference Literature 2 may be used. In this method, a three-dimensional super-resolution image is directly constructed without constructing a two-dimensional super-resolution image from the image acquired at each position in the optical axis direction.

(Reference Literature 2) Mats G. L. Gustafsson, Lin Shao, Peter M. Carlton, C. J. Rachel Wang, Inna N. Golubovskaya, Zacheus Cande, David A. Agard, and John W. Sedat, "Three-dimensional resolution doubling in widefield fluorescence microscopy by structured illumination", June 2008/Vol. 94, No. 12/Biophysical Journal pp. 4957-70

That is, while a circular region may be clipped and rearranged in a frequency space in a two-dimensional case (FIG. 6), for example, a disk-like region with a depressed center part may be clipped and rearranged in a three-dimensional frequency space in a three-dimensional case. For example, it is possible to construct a three-dimensional super-resolution image structured in the optical axis direction by three-dimensionally rearranging 18 Fourier images (6 Fourier images in each of the three directions) obtained by changing the phase and the stripe direction of the illumination light L1 and performing a three-dimensional inverse Fourier transform on an image obtained through rearrangement.

Figure 14:
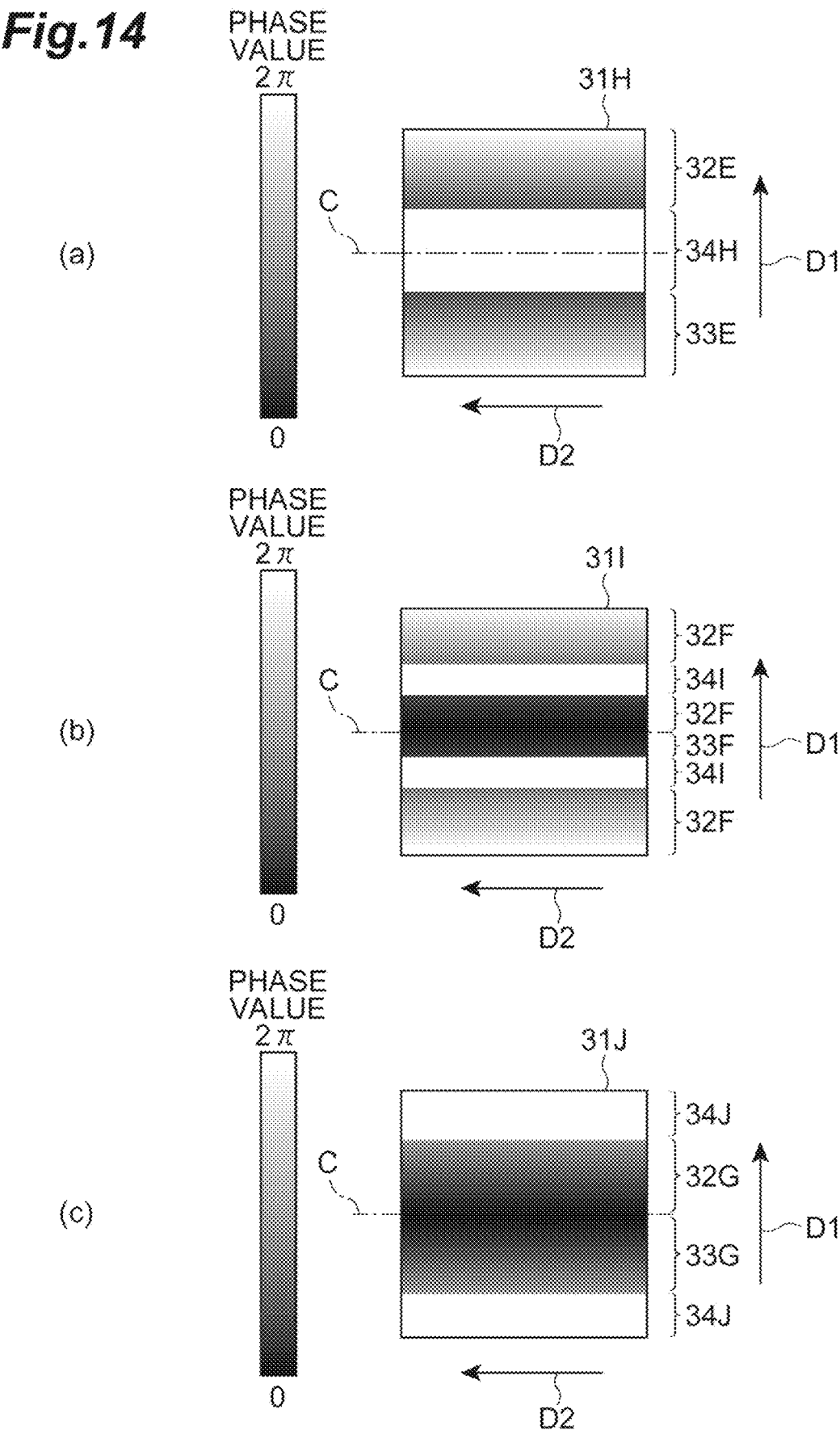
FIG. 14 is a diagram illustrating eighth to tenth modified examples of the basic phase pattern.

A basic phase pattern 31H of an eighth modified example, a basic phase pattern 31I of a ninth modified example or a basic phase pattern 31J of a tenth modified example illustrated in FIG. 14 may be used. The basic phase pattern 31H is different from the basic phase pattern 31E in that the phase is 0 radians in the third region 34H and the phase values are discontinuous at each of a boundary between the first region 32E and the third region 34B 34H and a boundary between the second region 33E and the third region 34H.

The basic phase pattern 31I is different from the basic phase pattern 31F in that the phase is 0 radians in the two third regions 34I and the phase values are discontinuous at each of a boundary between the first region 32F and the third region 34I and a boundary between the second region 33F and the third region 34I. The basic phase pattern 31J is different from the basic phase pattern 31G in that the phase is 0 radians in the two third regions 34J and the phase values are discontinuous at each of a boundary between the first region 32G and the third region 34J and a boundary between the second region 33G and the third region 34J.

With respect to such basic phase patterns 31H to 31J, as in the above embodiment, it is possible to radiate stripe-like illumination light L1 from the objective lens 16 to the sample S and simplify the configuration. Also, it is possible to generate three-dimensional structured illumination light structured in the optical axis direction of the objective lens 16.

In the above embodiment, reflected light from the sample S may be imaged instead of fluorescence or transmitted light of the sample S may be imaged. In this case, the illumination light L1 radiated to the sample S may not be excitation light. In the above embodiment, the control unit 19 may calculate the phase pattern P by superimposing a pattern for aberration correction on the basic phase pattern 31. The pattern for the aberration correction may be created based on image data output from the photodetector 18. Thereby, feedback correction can be performed.

The illumination light L1 of the above embodiment forms an image in a sheet shape on the optical axis X. Thus, the image acquisition device of the present invention can be applied to a light-sheet microscope. In the light-sheet microscope, sheet-like excitation light (illumination light L1) is radiated to the sample S and detection light L2 emitted from the sample S is imaged in association with irradiation of the illumination light L1. For example, the light-sheet microscope is configured to include a first objective lens configured to radiate illumination light L1 modulated by the SLM 13 to the sample S and a second objective lens configured to guide detection light L2 emitted from the sample S to the photodetector 18 in association with irradiation of the illumination light L1 from the first objective lens. For example, the optical axis of the first objective lens and the optical axis of the second objective lens are orthogonal to each other. Then, a light focus position of the illumination light L1 is scanned with respect to the sample S in a direction orthogonal to the optical axis of the first objective lens, and the image of the sample S is acquired at each light focus position. For example, in the light-sheet microscope 1, because a region in which the excitation light L1 is radiated to the sample S is small, deterioration of the sample S such as photofading or phototoxicity can be minimized and image acquisition can be speeded up.

REFERENCE SIGNS LIST

1: Structured illumination microscope (image acquisition device), 11: Light source, 13: Spatial light modulator, 16: Objective lens, 18: Photodetector, 19: Control unit, 20: Computer, 21: Controller, 31: Basic phase pattern, 32: First region, 33: Second region, 34E to 34J: Third region, 41: Diffraction grating pattern, 42: Lens pattern, C: Straight line (central line), D1: Predetermined direction, L1: Illumination light, L2: Detection light, P: Phase pattern, S: Sample (observation target)

The invention claimed is:

1. An image acquisition device for acquiring an image of an observation target by radiating structured illumination light, the image acquisition device comprising:
    a light source configured to output light;
    a spatial light modulator having a plurality of pixels two-dimensionally arranged and configured to modulate a phase of the light output from the light source for each of the plurality of pixels;
    an objective lens configured to radiate the modulated light to the observation target;
    a photodetector configured to capture an image of the light from the observation target; and
    a controller configured to control an amount of phase modulation for each of the plurality of pixels in accordance with a phase pattern in which phase values corresponding to the plurality of pixels are two-dimensionally distributed, the phase pattern generated based on a predetermined basic phase pattern including a first region in which the phase value continuously increases in a predetermined direction and a second region in which the phase value continuously decreases in the predetermined direction and facing the first region in the predetermined direction,
    wherein in both the first region and the second region in the basic pattern, the phase value is constant in a direction orthogonal to the predetermined direction,
    wherein the basic phase pattern is non-axisymmetric with respect to a straight line passing through a center in the predetermined direction and orthogonal to the predetermined direction,
    wherein the phase value is continuous at a boundary between the first region and the second region,
    wherein an absolute value of a gradient of the phase value in the second region is larger than an absolute value of a gradient of the phase value in the first region, and
    wherein an amount of phase delay of light modulated by the second region is larger than an amount of phase delay of light modulated by the first region based on the phase value being continuous at the boundary between the first region and the second region and based on the absolute value of the gradient of the phase value in the second region being larger than the absolute value of the gradient of the phase value in the first region.

2. The image acquisition device according to claim 1, wherein the phase value linearly increases in the predetermined direction in the first region and the phase value linearly decreases in the predetermined direction in the second region.

3. The image acquisition device according to claim 1, wherein the first region and the second region are adjacent to each other and the phase values are continuous at a boundary therebetween.

4. The image acquisition device according to claim 1, wherein the basic phase pattern further includes a third region in which the phase value is constant.

5. The image acquisition device according to claim 4, wherein the basic phase pattern includes two of the first regions, two of the second regions, and two of the third regions; and
    wherein one of the third regions is arranged between the first regions in the predetermined direction and the other of the third regions is arranged between the second regions in the predetermined direction.

6. The image acquisition device according to claim 4, wherein the basic phase pattern includes two of the third regions, and
    wherein one of the third regions is arranged at a side opposite to the second region in the predetermined direction with respect to the first region and the other of the third regions is arranged at a side opposite to the first region in the predetermined direction with respect to the second region.

7. The image acquisition device according to claim 1, wherein the phase pattern is a phase pattern in which a diffraction grating pattern of a diffraction grating shape and the basic phase pattern are superimposed on each other.

8. The image acquisition device according to claim 1, wherein the phase pattern is a phase pattern in which a lens pattern of a lens shape and the basic phase pattern are superimposed on each other.

9. An image acquisition method of acquiring an image of an observation target by radiating structured illumination light, the image acquisition method comprising:
    modulating, by a spatial light modulator having a plurality of pixels two-dimensionally arranged, a phase of the light output from a light source for each of the plurality of pixels, the modulating including controlling an amount of phase modulation for each of the plurality of pixels in accordance with a phase pattern generated based on a predetermined basic phase pattern and in which phase values corresponding to the plurality of pixels are two-dimensionally distributed, the basic phase pattern including a first region in which the phase value continuously increases in a predetermined direction and a second region in which the phase value continuously decreases in the predetermined direction and facing the first region in the predetermined direction, wherein in both the first region and the second region in the basic pattern, the phase value is constant in a direction orthogonal to the predetermined direction; and
    radiating the modulated light to the observation target and capturing an image of light from the observation target,
    wherein the basic phase pattern is non-axisymmetric with respect to a straight line passing through a center in the predetermined direction and orthogonal to the predetermined direction,
    wherein the phase value is continuous at a boundary between the first region and the second region,
    wherein an absolute value of a gradient of the phase value in the second region is larger than an absolute value of a gradient of the phase value in the first region, and
    wherein an amount of phase delay of light modulated by the second region is larger than an amount of phase delay of light modulated by the first region based on the phase value being continuous at the boundary between the first region and the second region and based on the absolute value of the gradient of the phase value in the second region being larger than the absolute value of the gradient of the phase value in the first region.

10. A spatial light modulation unit for use in a structured illumination microscope, the spatial light modulation unit comprising:
- a spatial light modulator having a plurality of pixels two-dimensionally arranged and configured to modulate a phase of input light for each of the plurality of pixels and to output modulated light; and
- a controller configured to control an amount of phase modulation for each of the plurality of pixels in accordance with a phase pattern in which phase values corresponding to the plurality of pixels are two-dimensionally distributed, the phase pattern generated based on a predetermined basic phase pattern including a first region in which the phase value continuously increases in a predetermined direction and a second region in which the phase value continuously decreases in the predetermined direction and facing the first region in the predetermined direction, wherein in both the first region and the second region in the basic pattern, the phase value is constant in a direction orthogonal to the predetermined direction, wherein the basic phase pattern is non-axisymmetric with respect to a straight line passing through a center in the predetermined direction and orthogonal to the predetermined direction, wherein the phase value is continuous at a boundary between the first region and the second region, wherein an absolute value of a gradient of the phase value in the second region is larger than an absolute value of a gradient of the phase value in the first region, and wherein an amount of phase delay of light modulated by the second region is larger than an amount of phase delay of light modulated by the first region based on the phase value being continuous at the boundary between the first region and the second region and based on the absolute value of the gradient of the phase value in the second region being larger than the absolute value of the gradient of the phase value in the first region.

* * * * *